Patented Aug. 6, 1946

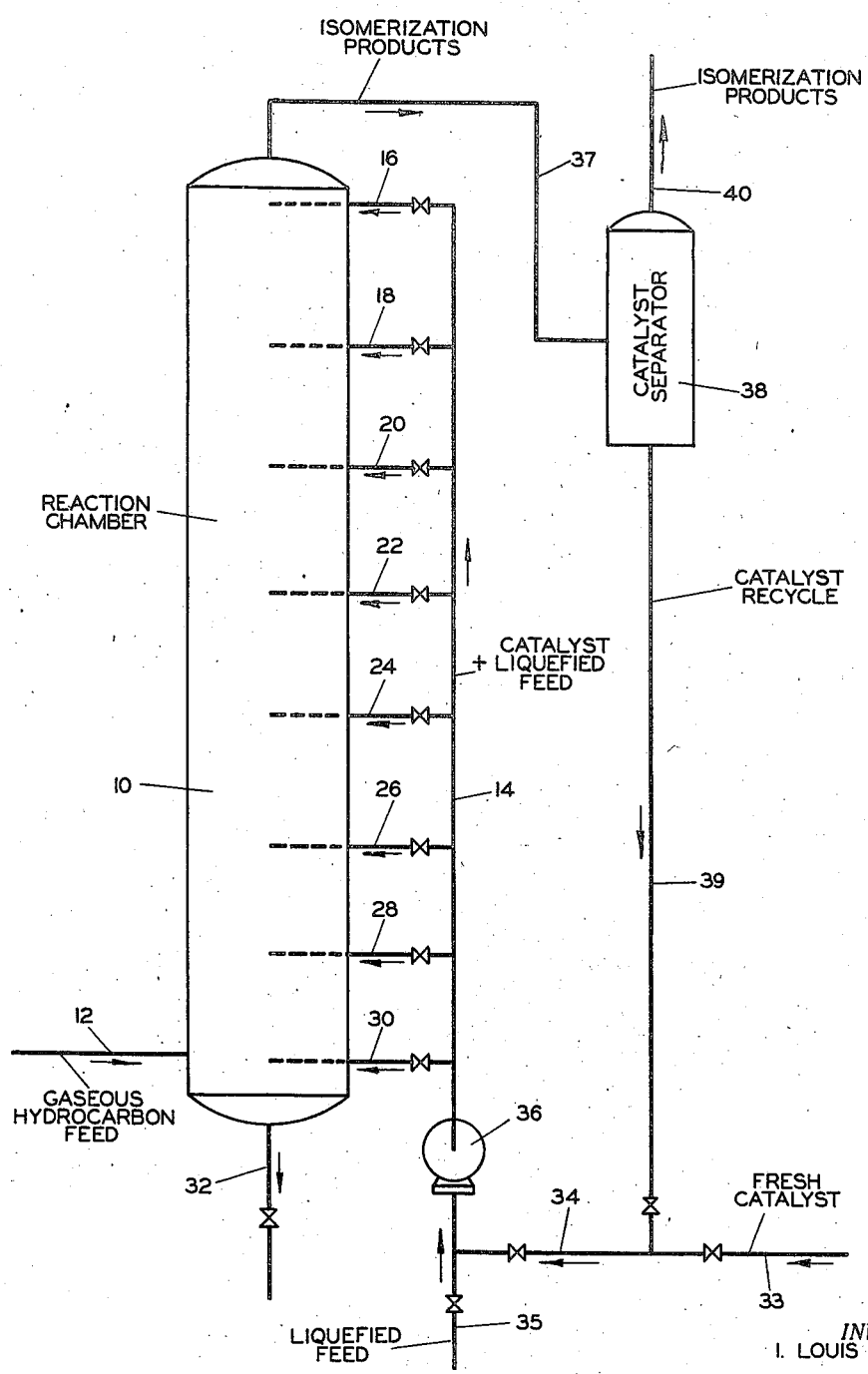

2,405,386

UNITED STATES PATENT OFFICE 2,405,386

ISOMERIZATION OF SATURATED HYDROCARBONS

I. Louis Wolk, Bartlesville, Okla., assignor to Phillips Petroleum Company, a corporation of Delaware Application October 5, 1942, Serial No. 460,831

2 Claims. (Cl. 260—683.5)

This invention relates to the catalytic isomerization of hydrocarbons, particularly the lower boiling saturated hydrocarbons such as the paraffins and the cycloparaffins or naphthenes. It has particular application to the formation of branched chain paraffins from less-branched or straight chain paraffins of the same molecular weight, wherein a mobile isomerization catalyst is utilized.

Isomerization of hydrocarbons has become an important industrial process because of the increased tendency toward high octane number motor fuels, and the development of special uses for certain individual hydrocarbons or groups of hydrocarbons. Thus, the isoparaffins are ordinarily much more valuable than the normal paraffins, both for use per se, and as stock for manufacturing other hydrocarbons by alkylation, dehydrogenation followed by polymerization, or other conversion processes. One of the most important commercial isomerization processes at the present time is the formation of isobutane from normal butane, using aluminum chloride catalysts. Accordingly, I shall describe my invention with particular reference to such a process, and its application to other isomerizations, and/or other catalysts, will be obvious to those skilled in the art in view of the present disclosure.

The isomerizations with which this invention is concerned are equilibrium reactions; that is, at a given temperature the percentage of each of the individual isomers in a mixture of isomers is fixed if equilibrium is attained. For example, if either pure normal butane or pure isobutane be contacted with a suitable catalyst, such as aluminum chloride, under given temperature and pressure conditions permitting the reaction to proceed but preferably avoiding side reactions such as cracking, after a period of time an equilibrium mixture of normal and isobutane will be formed. In this mixture, the percentage of isobutane will be the same regardless of whether the charging stock was isobutane or normal butane. This means that in isomerizing normal butane to produce isobutane, there is a maximum conversion obtainable at any given temperature. The lower temperatures give the greatest conversion, but too low a temperature cannot be used because the reaction rate will decrease to an uneconomic level. On the other hand, higher temperatures give higher reaction rates, but the equilibrium mixture contains less isobutane. Furthermore, excessively high temperatures promote undesired side reactions, particularly cracking.

While the percentage yield of isobutane at equilibrium is dependent only on temperature, the rate of reaction is dependent on temperature and also on other important factors, including relative concentration of normal and isobutane in the mixture at the given time, catalyst activity, and the amount of catalyst surface contacted by the butane, or in other words, on the time of contact of a unit volume of butane with a unit of catalyst activity.

A large surface area for a given weight of active catalytic material may be obtained by various expedients which are well known in the art. For instance, inert carriers or extenders may be impregnated by or mixed with the catalyst, or the catalyst may be produced in a porous form, or prepared in a condition of fine subdivision as in the use of small grains or powdered catalyst, which may be suspended in liquid or gaseous hydrocarbons undergoing isomerization. The amount of catalyst surface contacted with reactants is also dependent on the concentration of catalyst in reactants, that is, the amount of catalyst, of whatever kind, mixed with the reactants, or placed in a stationary bed of catalyst through which the reactants pass, and on the flow rate of reactants through a reaction zone.

Thus it is seen that a number of different reaction conditions influence the rate of reaction, and these reaction conditions frequently vary from point to point in the reaction zone. As the conversion of normal to isobutane occurs in an isomerization zone through which the hydrocarbons are flowing, the decrease in concentration of the normal butane and corresponding increase in concentration of isobutane tends to slow the reaction, particularly as equilibrium is approached. Due to the exothermic nature of this reaction, the temperature has a tendency to increase, causing a tendency toward increased reaction rate. A mobile catalyst becomes deactivated as it passes through the reaction zone, sometimes slightly and sometimes greatly, depending upon the nature of the catalyst and the severity of conditions, and the reaction rate is less at the point of less catalytic activity.

An object of the present invention is to provide a process of the catalytic isomerization of hydrocarbons in which the catalyst will be introduced into the reaction zone in a manner which will give a highly extended catalyst surface. A further object is to introduce such catalyst so that catalytic material of greater catalytic activity and relative concentration will be present in the reaction zone at those points where the rate of conversion may tend to diminish with approach of equilibrium and with normal deactivation of catalyst. A still further object is to accomplish the foregoing objectives while at the same time maintaining substantially isothermal reaction conditions and compensating for the inherently exothermic nature of the reaction.

It has been found that tendencies toward change in reaction rate caused by varying reaction conditions, the tendency for progressive temperature increase due to exothermity of the reaction, and the tendency for a drop in the extent of conversion as the end of the reaction zone is approached, may all be alleviated and compensated for by introducing the main body of reactant, such as normal butane, into an elongated reaction zone in gaseous phase, and at the same time introducing another portion of the reactant into the reaction zone in liquefied form, containing dissolved and/or suspended therein at least a portion of the catalyst, for example aluminum chloride. The liquefied butane immediately upon contact with the gas stream will evaporate causing concomitant cooling of the reactants and suspension of the catalyst in the gas stream. The catalyst, having been in solution, or in finely divided form in suspension in the liquid butane, will be suspended in the gas thus presenting a highly extended surface, and being carried along with the gas stream. This injection of liquid comprising catalyst plus reactant may be done at a single point at the reaction zone say near the entrance thereof, but is preferably done at a plurality of points along the path of reaction in order to approach constant reaction conditions.

In the accompanying drawing, the reaction chamber 10 comprises a ceramic-lined vertical tower. The gaseous isomerization feed which is led into reactor 10 through line 12 comprises normal butane, either pure or admixed with minor amounts of isobutane, propane, hydrogen, or other light gases, and anhydrous hydrogen chloride which acts as catalyst activator. This feed must be substantially anhydrous, and may if necessary be dehydrated by suitable methods prior to its introduction into chamber 10. The hydrogen chloride may be introduced into the reaction chamber in other ways if desired. The feed in line 12 is heated to the proper temperature by means not shown. Suitable temperature and pressure conditions at the inlet of chamber 10 are 200° F. and 75 lb. per sq. in. gage. A flow rate of 0.1 to 2.0 liquid volumes of butane per volume of catalyst chamber per hour may be used, and complete equilibrium conversion in one pass is not ordinarily attempted in such a process, the hydrocarbon effluents comprising from 25 to 50 per cent isobutane, depending upon the flow rate used.

The catalyst, which for purposes of example, is aluminum chloride, is dissolved and/or suspended in a quantity of liquefied n-butane by introducing finely divided catalyst by line 34 into a stream of liquefied normal butane flowing through conduit 35. The catalyst suspension or solution is pumped into the reaction zone by means of pump 36 and introduced via line 14 through any or all of lines 16, 18, 20, 22, 24, 26, 28 and 30, the flow through each of these lines being suitably controlled by valves. Fresh catalyst becomes suspended in the reaction stream progressively in the direction of flow, while at the same time the reaction temperature throughout the bed is maintained at any desired temperature by vaporization of liquid butane which carries the catalyst. The liquefied hydrocarbon contains a high proportion of catalyst, say from 10% to equal amounts by weight thereof, so that the introduction of a minor amount of catalyst mixture will result in a catalyst concentration in the reactor of 1 to 25% or more of catalyst by weight of hydrocarbon in the reaction zone. The dispersed condition of the catalyst will permit substantial conversion with smaller total amounts of catalyst than conventional operation.

In the absence of the practice of my invention, that is by conventional methods, the reactants pass through the reaction chamber, and the normal butane is isomerized to isobutane with the evolution of heat. Such heat of reaction is difficult to remove from the large reactor, and as a consequence the temperature of the gases rises as they pass upwardly through the reaction chamber 10. The temperature at the outlet thereof is accordingly appreciably higher than at the inlet, the exact temperature difference, of course, varying with the particular chamber, type of reaction, flow rate, extent of reaction, etc. In many cases this temperature difference will amount to from 15 to 50 or 60° F. or even more. Such an increase in temperature tends to increase the reaction rate, and in the ordinary methods of isomerization wherein the reactants are passed through a uniform bed of catalyst, the reaction frequently "runs-away" and is difficult to bring under control. Increased reaction rate due to increased temperature causes an increased rate of heat evolution, which in turn tends to increase the temperature still more. Excessive temperatures caused by such action cause cracking and other undesirable degradation of the butane undergoing reaction, with consequent loss of material, increased fractionation load from light gases so-formed, and damage to the catalyst.

Such temperature rise is obviated in the present process due to progressive vaporization of liquefied butane. Other varying reaction conditions operating to influence the rate of reaction are the decreasing concentration of n-butane and the accompanying drop in conversion rate, as well as the deactivation of catalyst as it progresses through the reaction zone. These factors are compensated for in the present process very effectively. The decreasing butane concentration is compensated for by the multipoint introduction of liquid butane which evaporates to provide additional reactant, and at the same time shift the equilibrium to the right by the law of mass action. The increased concentration of catalyst along the direction of flow also counterbalances the effect of lowered n-butane concentration. The catalyst deactivation is compensated for by the progressive introduction of suspended catalyst through vaporization of the butane. Normally, the drop in conversion rate is at least partially counterbalanced by increase in temperature as the reaction proceeds. When this temperature increase is neutralized by evaporation of liquefied hydrocarbon, there will thus be a tendency for conversion to drop off. This latter tendency is also prevented by the higher concentration of catalyst in the direction of flow.

The isomerization products, which include isobutane, unconverted n-butane, hydrogen chloride, light gases, and traces of $C_5$ and heavier hydrocarbons, leave chamber 10 via line 37 and pass through catalyst separator 38 where suspended catalyst settles out by gravity and is returned to the catalyst inlet via conduit 39. Other well known settling methods may be used such as condensation, centrifugal separators, filters and the like. Sludge formed by reaction of catalyst may be removed from the bottom of the tower via conduit 42, and any sludge carried overhead may be removed from the effluent in 38 along with the catalyst or by any desired means. The isomerization products pass overhead through line 40 to conventional separating means not shown where isobutane is recovered and unconverted n-butane is returned to the reaction zone. Fresh catalyst may be added as required through conduit 33.

The invention has been described with particular reference to aluminum chloride catalysts. However, it is to be understood that it is in nowise limited thereto, and may be used in conjunction with many other mobile isomerization catalysts. Other aluminum halides, particularly aluminum bromide, and various other metal halide isomerization catalysts of the Friedel-Crafts type may be used. Ordinarily halogen-containing promoters, such as hydrogen chloride, hydrogen bromide, etc., or other promoters are used with such catalysts. In the same manner as described above, other normal paraffins such as pentane and hexane, etc., and less highly branched paraffins, may be converted to those more highly branched.

In the case of aluminum chloride its solubility in liquid butane, while appreciable, is ordinarily not sufficient for optimum results; therefore it is preferable to use an excess so that the catalyst is in suspension or slurry form. Other catalysts of the type described, such as aluminum bromide, are more soluble and true solutions thereof may more readily be used.

While I have discussed my invention in some detail, and presented various modes of operation, it is not limited to the exact variants shown, but is subject to numerous other modifications. Many modifications may be utilized in conjunction with the invention, which is to be limited only by the appended claims.

I claim:

1. A process for the isomerization of normal butane to isobutane which comprises passing upwardly through an elongated vertical reactor a gaseous mixture of normal butane with catalyst-activating amounts of hydrogen chloride having suspended therein finely divided solid aluminum chloride catalyst which is carried along with the gas stream, maintaining in said reactor isomerizing conditions of temperature and pressure, removing from the top of said reactor the resulting gaseous reaction mixture comprising isobutane so produced, passing said reaction mixture to a separating zone wherein suspended finely divided solid active aluminum chloride catalyst settles by gravity from the gaseous material, passing thus-settled aluminum chloride catalyst particles together with fresh finely divided solid aluminum chloride to admixture with liquid normal butane in such quantities as to prepare a slurry of finely divided solid aluminum chloride in liquid normal butane, introducing said slurry into said reactor at a plurality of points spaced along the length thereof for evaporation of said liquid normal butane and suspension of said aluminum chloride in said upwardly flowing gases, in such quantities at each point as to maintain a substantially constant temperature throughout said reaction zone and as to maintain an increasing concentration of active solid aluminum chloride catalyst in the direction of flow sufficient to maintain a substantially constant rate of conversion throughout said reactor.

2. A process for the isomerization of a low-boiling normal paraffin to the corresponding branched-chain paraffin which comprises passing upwardly through an elongated vertical reactor a gaseous mixture of normal paraffin with a halogen-containing promoter having suspended therein finely divided solid metal halide isomerization catalyst of the Friedel-Crafts type which is carried along with the gas stream, maintaining in said reactor isomerizing conditions of temperature and pressure, removing from the top of said reactor the resulting gaseous reaction mixture comprising branched-chain paraffin so produced, passing said reaction mixture to a separating zone wherein suspended finely divided solid active metal halide catalyst settles by gravity from the gaseous material, passing thus-settled metal halide catalyst particles together with fresh finely divided solid metal halide to admixture with liquid normal paraffin in such quantities as to prepare a slurry of finely divided solid metal halide in liquid normal paraffin, introducing said slurry into said reactor at a plurality of points spaced along the length thereof for evaporation of said liquid normal paraffin and suspension of said metal halide in said upwardly flowing gases, in such quantities at each point as to maintain a substantially constant temperature throughout said reaction zone and as to maintain an increasing concentration of active solid metal halide catalyst in the direction of flow sufficient to maintain a substantially constant rate of conversion throughout said reactor.

I. LOUIS WOLK.